United States Patent
Kurian et al.

(10) Patent No.: US 11,115,488 B2
(45) Date of Patent: Sep. 7, 2021

(54) EVENT TRACKING AND NOTIFICATION BASED ON SENSED DATA

(71) Applicant: Bank of America Corporation, Charlotte, NC (US)

(72) Inventors: Manu Kurian, Dallas, TX (US); Gopikrishna Nemalikanti, Frisco, TX (US); Jayachandra Varma, Irving, TX (US); Abhishek Nagpal, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/795,810

(22) Filed: Feb. 20, 2020

(65) Prior Publication Data
US 2020/0195739 A1    Jun. 18, 2020

Related U.S. Application Data

(63) Continuation of application No. 15/685,102, filed on Aug. 24, 2017, now Pat. No. 10,616,357.

(51) Int. Cl.
*H04L 29/08*     (2006.01)

(52) U.S. Cl.
CPC .............. *H04L 67/26* (2013.01); *H04L 29/08* (2013.01); *H04L 67/1014* (2013.01); *H04L 67/22* (2013.01)

(58) Field of Classification Search
CPC ..................................................... H04L 67/26
See application file for complete search history.

(56) References Cited

U.S. PATENT DOCUMENTS

| | | |
|---|---|---|
| 8,055,580 B1 | 11/2011 | Homuth et al. |
| 8,095,445 B2 | 1/2012 | Talbert et al. |
| 8,160,960 B1 | 4/2012 | Fei et al. |
| 8,335,739 B1 | 12/2012 | Bol et al. |
| 8,571,986 B2 | 10/2013 | Maley et al. |
| 8,886,569 B2 | 11/2014 | Patel et al. |
| 9,277,366 B2 | 3/2016 | Busch |
| 9,390,145 B2 | 7/2016 | Weiss et al. |
| 9,514,456 B2 | 12/2016 | England et al. |
| 9,940,374 B2 * | 4/2018 | Orumchian ............ G06Q 10/04 |
| 2011/0225023 A1* | 9/2011 | Evens ..................... G06Q 30/02 705/7.31 |

(Continued)

OTHER PUBLICATIONS

Jan. 23, 2020—U.S. Notice of Allowance—U.S. Appl. No. 15/685,102.

*Primary Examiner* — James A Edwards
(74) *Attorney, Agent, or Firm* — Banner & Witcott, Ltd.; Michael A. Springs

(57) ABSTRACT

Aspects of the disclosure relate to transforming event data associated with an entity using a multicomputer platform and directing a client computing device to perform a determined action based on a detected event characteristic of the event data and a detected current event. With some embodiments, an event tracking server detects the current event from sensed data provided by a sensed data server and identifies a correlation measure between the detected event characteristic and the detected current event. The event tracking server may direct one or more client computing devices to perform one or more actions related to an entity based on the correlation measure.

17 Claims, 11 Drawing Sheets

(56) References Cited

U.S. PATENT DOCUMENTS

| | | |
|---|---|---|
| 2012/0265681 A1 | 10/2012 | Ross |
| 2013/0191195 A1 | 7/2013 | Carlson et al. |
| 2013/0311324 A1 | 11/2013 | Stoll et al. |
| 2014/0081834 A1 | 3/2014 | Rotman |
| 2014/0278754 A1* | 9/2014 | Cronin .............. G06F 16/24578 705/7.29 |
| 2015/0149308 A1 | 5/2015 | Lin |
| 2015/0278225 A1 | 10/2015 | Weiss et al. |
| 2016/0086222 A1 | 3/2016 | Kurapati |
| 2016/0189149 A1 | 6/2016 | MacLaurin et al. |
| 2018/0232769 A1 | 8/2018 | Barak et al. |

* cited by examiner

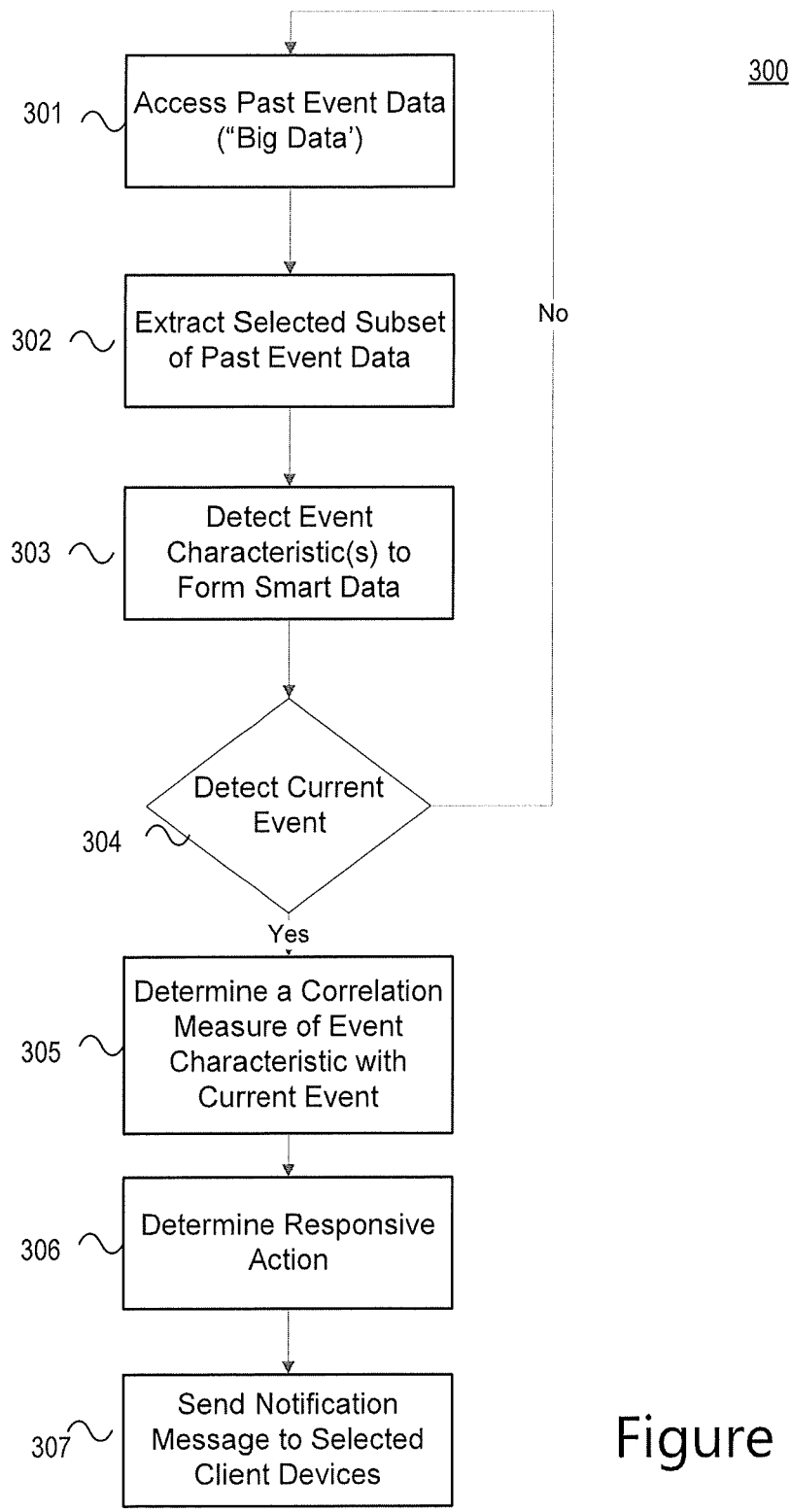

EVENT TRACKING AND NOTIFICATION BASED ON SENSED DATA

CROSS REFERENCE TO RELATED APPLICATION

This patent application is a continuation of U.S. patent application Ser. No. 15/685,102 filed Aug. 24, 2017 entitled "Event Tracking and Notification Based on Sensed Data". This application claims priority to and the benefit of the above-identified application which is fully incorporated by reference herein in its entirety

FIELD

Aspects of the disclosure relate to electrical computers, digital processing systems, and multicomputer data transferring. For instance, some aspects utilize digital processing systems to detect an event characteristic from previous event data. Based on the detected event characteristic and current event data, a client computing device may be directed by a computing platform to perform an appropriate action.

BACKGROUND

As the amount of available data is increasing in an exponential manner, it is important to store, access, organize, and/or otherwise use data in more efficient ways. For example, some systems are being configured to utilize "big data" for various purposes, but in many instances, such data sets are so large and/or complex that traditional data processing application software might be inadequate to handle the relatively large amounts of data included in big data sets.

SUMMARY

Aspects of the disclosure provide effective, efficient, scalable, and convenient technical solutions that address and overcome the technical problems associated with storing, accessing, organizing, and/or otherwise using big data sets. In particular, one or more aspects of the disclosure provide techniques for processing event data associated with an entity using multicomputer processing and subsequently directing a client computing device to perform a determined action based on the event data.

In accordance with one or more embodiments, an event tracking server accesses one or more data storage devices to obtain previous event data. The event tracking server extracts a subset of the accessed event data based on one or more event parameters, processes the subset to detect one or more event characteristics, and transforms the subset to obtain smart data. In addition, the event tracking server receives sensed data about an entity, from which the server determines whether a current event has occurred. The event tracking server then identifies a correlation measure between a detected event characteristic and the current event. Based on the correlation measure, the event tracking server may determine an action and send a notification message to a selected client computing device directing the client device to perform the determined action.

In accordance with one or more embodiments, an event tracking server initiates an action at a client computing device when the corresponding correlation measure is greater than a predetermined threshold.

In accordance with one or more embodiments, an event tracking server initiates an action at a client computing device when the corresponding correlation measure is less than a predetermined threshold.

In accordance with one or more embodiments, an event tracking server detects a current event about an entity from time-stamped geographical data obtained from a client computing device of the entity.

In accordance with one or more embodiments, an event tracking server detects an event characteristic from past (previous) event data about an entity. Event characteristics may be indicative of a pattern and/or a trend.

In accordance with one or more embodiments, a computing platform includes an event configuration server that supports configuring event tracking through a set of graphical user interfaces. Configuration data may be entered via the graphical user interfaces, and the configuration data may include at least one event parameter and/or client device addresses. An event tracking server may subsequently send request for event tracking data. In some instances, however, when privacy is invoked for an entity, the event configuration server may deny access for the requested data.

In accordance with one or more embodiments, an event tracking server accesses one or more data storage devices for previous event data for an entity. The event tracking server extracts a subset of the accessed event data based on one or more event parameters and processes the subset to attempt to detect one or more event characteristics. In addition, the event tracking server receives sensed data about the entity, from which the server determines whether a current event has occurred. The event tracking server then determines whether both the detected event characteristic and the current event have occurred. Based on the joint occurrence of the event characteristic and the detected current event, the event tracking server determines one or more actions and sends a notification message to a selected client computing device directing the client device to perform the one or more determined actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3A depicts a flowchart illustrating a method that may be performed by the event tracking server shown in FIG. 2 in accordance with one or more embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a determining an action to be performed for an entity based on smart data and sensed data associated with the entity. A computing device (e.g., a server) may determine a correlation measure between the smart data and current event data associated with a current event that is detected from the sensed data. The server may determine an appropriate action, generate a notification message, and send the notification message to a client computing device to direct the client computing device to perform the determined action.

Some embodiments may support different types of entities. For example, an entity may include a customer, a group of customers based on a geographical or demographic characteristic, a particular product, or vendor.

Some embodiments may support different exemplary situations. For example, previous event data may be indicative of a user's transaction history while the sensed data may be indicative of the user's location. When an event tracking server determines that the user is approaching a particular shopping destination, the server may direct a client computing device associated with the shopping destination and/or user to perform a determined action. For example, the determined action may be that the shopping destination reserve an anticipated purchased item based on a purchase pattern of the user and an anticipated purchase of the user based on the proximity of the user to the shopping destination. As another example, the determined action may be conveyed in a notification message that the user should use a particular credit card based on a current credit card offering and the anticipated purchase of an item.

Figure 1:
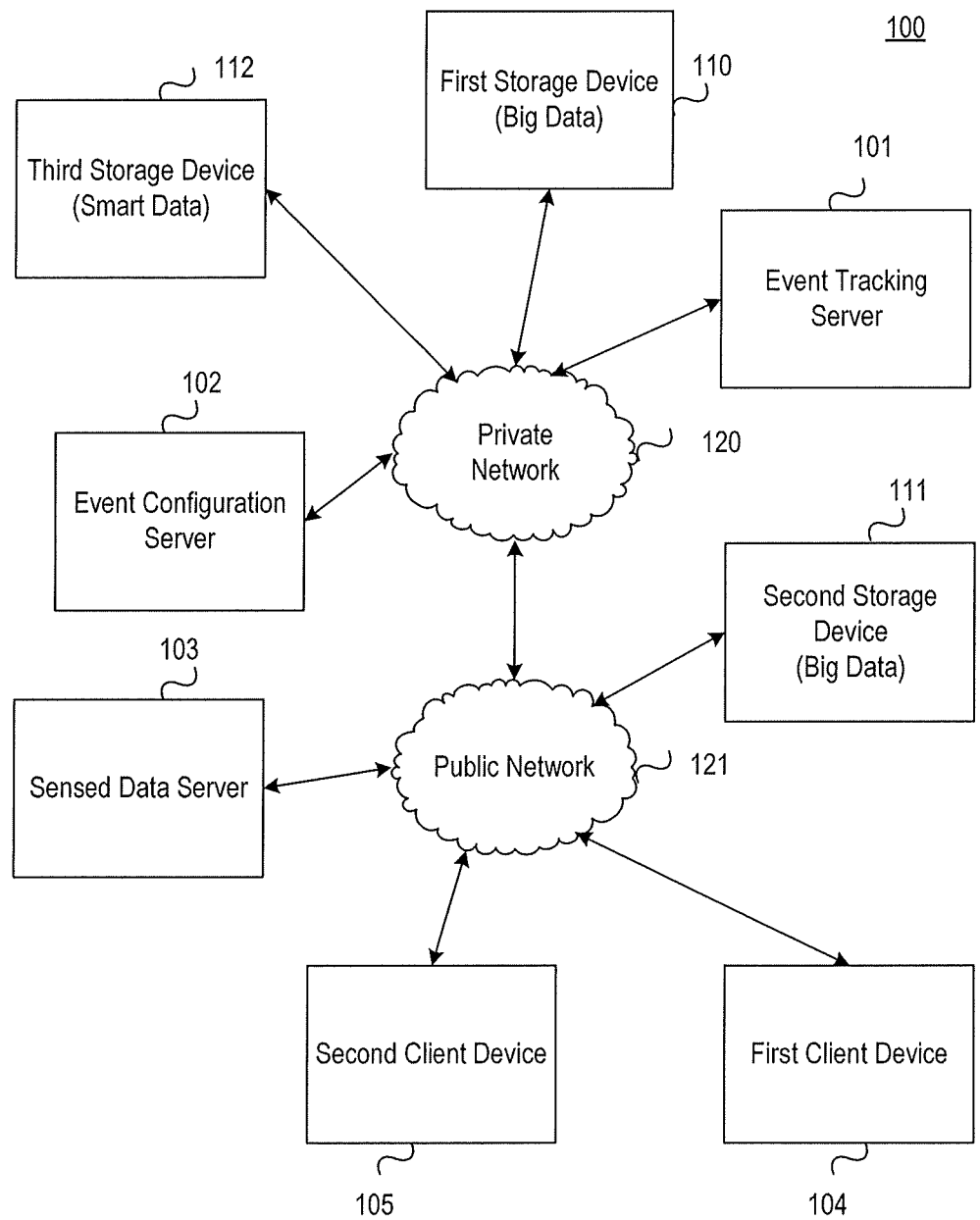
FIG. 1 depicts an illustrative computing environment for utilizing multicomputer processing to enable event tracking and control of client computing devices in accordance with one or more example embodiments.

FIG. 1 depicts an illustrative computing environment for utilizing multicomputer processing to enable event tracking and control of client computing devices in accordance with one or more example embodiments. Computing environment 100 may include one or more computing devices and/or other computer systems. For example, computing environment 100 may include event tracking server 101, event configuration server 102, sensed data server 103, first client computing device 104, and second computing device 105.

Event tracking server 101 may be a server computing device that is configured by event configuration server 102 to track events associated with an entity, determine an action from the tracking, and generate and send a notification message to a client computing devices in order to direct the client computing device to perform the action.

Event configuration server 102 may be a server computing device that is configured to obtain one or more event parameters that pertain to event data for an entity (e.g., a customer) through an input device. For example, event parameters may relate to a vendor that the entity may frequent, a product that the entity may purchase, or a product that the entity has previously purchased. Configuration server 102 may send the one or more event parameters to event server 101 to produce smart data based on big data (e.g., by reducing a big data set based on the one or more event parameters to produce the smart data set).

Event tracking server 101 may be a server computing device that is configured to obtain portions of big data from one or more data sources (e.g., data sources 110 and 111 which may span different networks 120 and 121). In some instances, big data may include data sets that are very large or complex, and traditional data processing applications are inadequate to deal with the typical expansive amount of data. In accordance with one or more arrangements, event tracking server 101 may obtain a subset of the big data based on the event parameters and further transform the data subset by detecting one or more event characteristics in order to obtain smart data associated with the entity.

In some instances, in detecting an event characteristic, event tracking server 101 may, for example, detect a pattern or trend associated with the entity. Consequently, event tracking server 101 processes the data subset based on the detected event characteristic, thus transforming the accessed big data to smart data that may be stored on data storage device 112 on private network 120. One advantage of this approach with respect to traditional approaches is that the transformed data (smart data) may be used more efficiently in a faster fashion to direct a determined action to be performed by client computing devices 104 and/or 105.

Subsequent to forming smart data, event tracking server 101 may obtain sensed data (e.g., geographical location and corresponding time data) from sensed data server 103. From the sensed data, event tracking server 101 may detect the occurrence of a current event. In some embodiments, when a plurality of client devices is associated with an entity, sensed data may also include an identity (e.g., address) of the client device providing the location information. As will be discussed in further detail, event tracking server 101 may determine a correlation measure of the event characteristic and the detected current event and initiate a determined action.

The above discussion may be clarified by way of a hypothetical example. In an example, the entity is a customer whom we may call Joe and who shops at store A. Event server 101, through configuration server 102, may be configured to perform event tracking from Joe's past transactions at store A. Event server 101 processes a subset of big data based on Joe's transactions at store A and discovers an interesting pattern (event characteristic) where Joe almost invariably shops at store A every Saturday morning and purchases a number of products, including product X. Moreover, Joe rarely shops at store A on any other day of the week. Event tracking server 101 may store the transformed data (smart data) that captures this event characteristic and any other discovered event characteristics on data storage device 112 for access at a subsequent time.

Continuing the above example, event tracking server 101 receives data from sensed data server 103 that indicates that Joe (via his wireless device) is moving toward and is a mile away from store A at 9:00 am on a Saturday. (However, there may be other hypothetical scenarios in which Joe is moving in a different direction (e.g., toward store B) so that event tracking server 101 may detect a different current event.) Consequently, there is a high correlation that Joe will be shopping at store A, and most likely will be purchasing product X. However, according to inventory records, store A has a limited number of product X available, so event tracking server 101 sends a notification message to a client computing device belonging to store A to reserve one unit of product X for Joe in anticipation of the purchase. In addition, a client computing device belonging to Joe may receive a notification message that the item is being reserved for him and that he should inquire with the store clerk at the front checkout register.

Continuing the above example, event tracking server 101 additionally determines that credit card P is offering additional reward points if Joe were to use it when purchasing product X. Consequently, event tracking server 101 also sends Joe a notification message informing Joe of this offer.

As an alternative continuation of the above example, if event tracking server 101 were to detect that Joe is traveling toward store A and is a mile away from store A but on Monday afternoon, server 101 may determine that there is a low correlation of Joe visiting store A based the determined event characteristic and the detected current event. It may be that Joe is actually returning from work and is merely driving past store A.

As another example, the associated entity is product Y that is sold at store B. Associated smart data for product Y indicates that approximately 100 units of product Y are sold on a weekly basis at store B (corresponding to an event characteristic). However, because of a sale during the week (corresponding to a current event), 90 units have already been sold during the first part of the week. Based on the joint occurrence of the determined trend and the sales event, event tracking server 101 determines that a notification message should be sent to the client computing device belonging to store B to initiate an expedited ad hoc order for additional units of product Y.

Referring again to FIG. 1, computing environment 100 also may include one or more computing platforms. For example, and as noted above, computing environment 100 may include event tracking server 101. As illustrated in greater detail below, server 101 may include one or more computing devices configured to perform one or more of the functions described herein. For example, server 101 may include one or more computers (e.g., laptop computers, desktop computers, servers, server blades, or the like).

Computing environment 100 also may include one or more networks (e.g., networks 120 and 121), which may interconnect servers 101-103, data storage devices 110-112, and client computing devices 104-105.

Private network 120 and/or public network 121 may include one or more sub-networks (e.g., local area networks (LANs), wide area networks (WANs), or the like). Private network 120 may be associated with a particular organization (e.g., a corporation, financial institution, educational institution, governmental institution, or the like) and may interconnect one or more computing devices associated with the organization. For example, event tracking server 101, event configuration server 102, and data storage devices 110 and 112 may be associated with an organization (e.g., a financial institution), and private network 120 may be associated with and/or operated by the organization, and may include one or more networks (e.g., LANs, WANs, virtual private networks (VPNs), or the like) that interconnect servers 101-102 and data storage devices 110 and 112. Public network 121 may connect private network 120 and/or one or more computing devices connected thereto with one or more networks and/or computing devices that are not associated with the organization. For example, sensed data server 103 and data storage device 111 may be owned, operated, and/or serviced by one or more entities different from the organization that operates private network 120, such as one or more customers of the organization and/or vendors of the organization, rather than being owned and/or operated by the organization itself or an employee or affiliate of the organization), and public network 121 may include one or more networks (e.g., the internet) that connect sensed data server 103, data storage device 111, and client computing devices 104-105.

Figure 2:
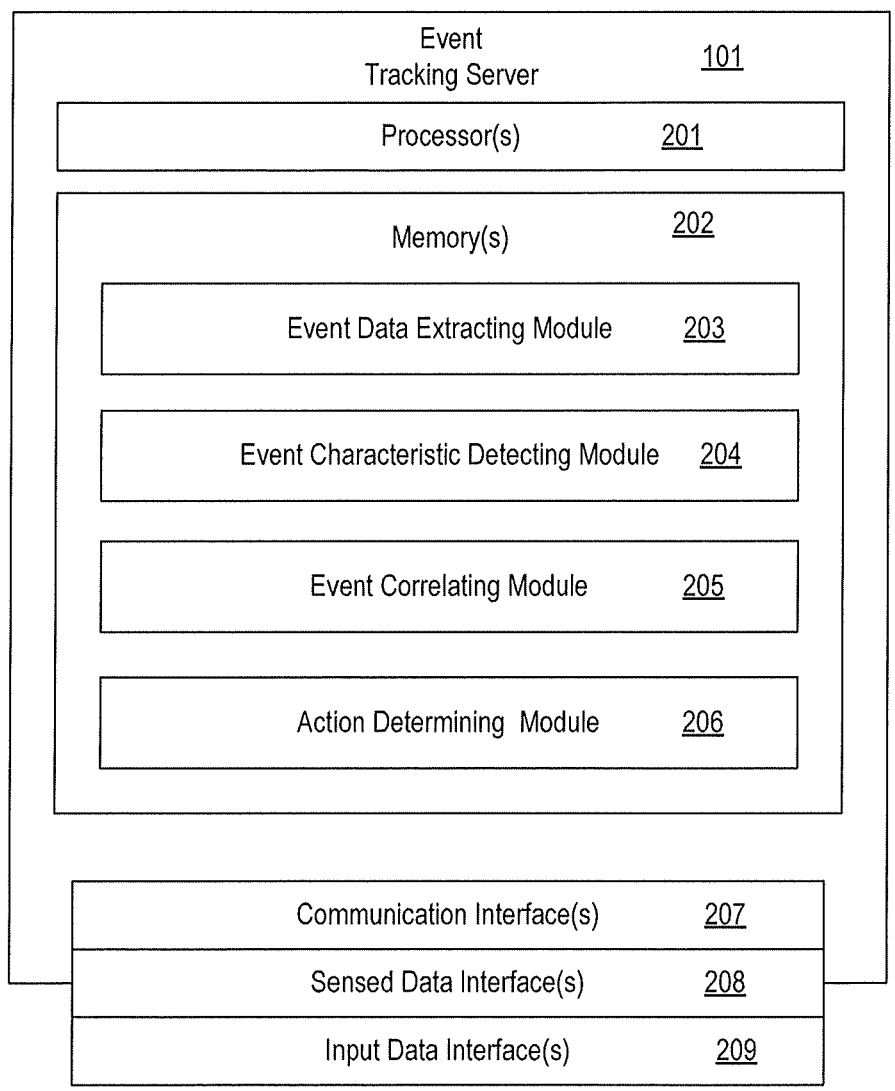
FIG. 2 depicts an illustrative event tracking server that supports the computing environment shown in FIG. 1 in accordance with one or more example embodiments.

FIG. 2 depicts an illustrative event tracking server that supports the computing environment shown in FIG. 1 in accordance with one or more example embodiments. Event tracking server 101 may include one or more processors 201, memory 202, communication interface 207, sensed data interface 208, and input data interface 209. A data bus may interconnect processor(s) 201, memory 202, and communication interfaces 207-209.

Communication interface 207 may be a network interface configured to support communication between event tracking server 101 and one or more networks (e.g., private network 120, public network 121, or the like). Sensed data interface 208 may be a network interface that supports data transfer in real-time or near real-time from sensed data server 103 via one or more networks so that event tracking server 101 can detect a current event. Input data interface 209 may be a network interface that supports data transfer from event configuration server 102.

Memory 202 may include one or more program modules having instructions that when executed by processor(s) 201 cause event tracking server 101 to perform one or more functions described herein and/or one or more databases that may store and/or otherwise maintain information which may be used by such program modules 203-206 and/or processor(s) 201. In some instances, the one or more program modules and/or databases may be stored by and/or maintained in different memory units of event tracking server 101 and/or by different computing devices that may form and/or otherwise make up event tracking server 101. For example, memory 202 may have, store, and/or include event data extracting module 203, event characteristic detecting module 204, event correlating module 205, and action determining module 206.

Event data extracting module 203 may comprise computer-executable instructions that direct and/or cause event tracking server 101 to access big data about an entity from data storage devices 110 and 111 and to extract a subset of the event data based on at least one event parameter.

Event characteristic detecting module 204 may comprise computer-executable instructions that direct and/or cause event tracking server 101 to detect one or more event characteristics (e.g., patterns and/or trends) from the subset and transforms the subset to obtain smart data that may be used by event tracking server 101 when a current event is detected, where the detected current event may be one of a plurality of possible events.

With some embodiments, event correlating module 205 may utilize two operators: correlation(a,b) and joint(c,d). The operator correlation(a,b) is a correlation measure of a and b. For example, the correlation measure may vary between 0 and 1, where a and b always occur together when 1 and are independent when 0. When a correlation measure is between 0 and 1, the relationship is somewhere between the above extremes. The second operator joint(c,d) is true when both c and d occur; otherwise it is false.

Event correlating module 205 may comprise computer-executable instructions that direct and/or cause event tracking server 101 to identify a correlation measure between an event characteristic and a detected current event. The correlation measure may be expressed as correlation (C, E), where C corresponds to the event characteristic and E corresponds to the detected current event. Some embodiments may support multiple (joint) events and/or multiple (joint) event characteristics in which multiple events and/or multiple event characteristics occur together. In such a situation, the correlation measure may be expressed as correlation $((C_1$ and $C_2$ and $\ldots C_n$, $E_1$ and $E_2$ and $\ldots E_n)$, $C_x$ is the $x^{th}$ event characteristic and Ey is the $y^{th}$ detected current event.

With some embodiments, if the correlation measure is sufficiently large (e.g., larger than a predetermined threshold), action determining module 206 may determine an appropriate action about the entity, generate a notification message indicative of the action, and send the notification message via communication interface 207 directing client computer device 104 and/or 105 to perform the action.

With some embodiments, both the correlation measure correlation$(C,E_1)$ must be larger than a predetermined threshold (7) and another event $E_2$ must occur. For example, event tracking server 101 might invoke a determined action at a client computing device only if joint(correlation(C,E1) >T,$E_2$). For example, continuing an example previously discussed, because Joe shops at store A almost every Saturday to purchase product X and is moving toward store A during Saturday morning, the correlation measure may be large. Moreover, store A is also offering a sale on related product Y. The resulting action may induce Joe to purchase product Y as well as product X.

With some embodiments, if the correlation measure is less than a predetermined threshold, action determining module 206 may send a notification message to a client computing device to perform an action to induce the entity to alter its behavior. Continuing the example above, where Joe shops at store A almost every Saturday but is moving away from store A during Saturday morning, the correlation measure may be small. However, in order to induce Joe to shop at store A, a notification message may be sent to Joe's device that offers Joe a special offer if Joe were to shop at store A that Saturday morning.

With some embodiments, modules 203-206 may be embodied in computer-executable code that is stored in one or more memory devices (e.g., memory 202) and executed by one or more computer devices (e.g., processor 201) and/or embodied in hardware/firmware components such as integrated circuits, application-specific integrated circuits (ASICs), field executable gate arrays, and the like.

FIG. 3A shows flowchart 300 that may be performed by event tracking server 101 as shown in FIG. 2 in accordance with one or more embodiments. At step 301, event tracking server 101 accesses big data about an entity from one or more data sources (e.g., data storage devices 110 and 111). At step 302, based on one or more event parameters, event tracking server 101 extracts a subset of the accessed data and attempts to detect an event characteristic from the subset at step 303. If the event characteristic is detected, event tracking server 101 may transform the data subset and form smart data about the entity. Event tracking server 101 may then store the smart data so that it can be accessed when a current event is detected at step 304.

Event tracking server 101 may detect one of a plurality of possible current events at step 304. Possible events may be associated with an activity of an entity (e.g., the physical movement of the entity) or may be external with respect to an activity of the entity (e.g., a credit card offering).

At step 305, event tracking server 101 identifies a correlation measure of the detected event characteristic and the detected current event. Event tracking server 101 determines a responsive action based on the correlation measure at step 306 and sends a notification message to selected client computing device at step 307 in order to direct the client computing device to perform the action.

Figure 3B:
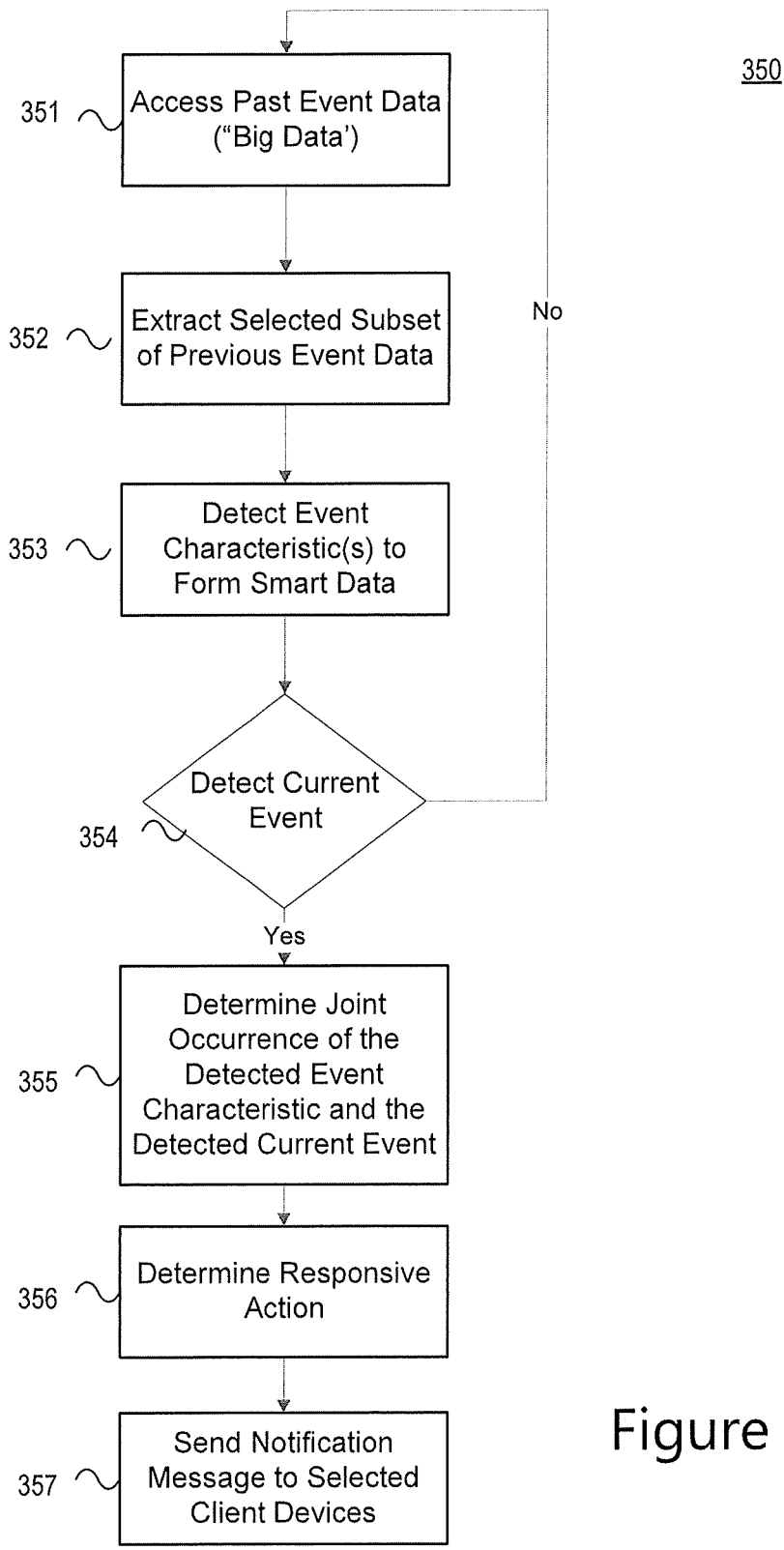
FIG. 3B depicts a flowchart illustrating a method that may be performed by the event tracking server shown in FIG. 2 in accordance with one or more embodiments.

FIG. 3B shows method 350 that may be performed by event tracking server 101 shown in FIG. 2 in accordance with one or more embodiments. Steps 351-354 and 356-357 are similar to steps 301-304 and 306-307, respectively, as shown in FIG. 3A. However, flowchart 350 differs from flowchart 300 at steps 355 and 356. Rather than determining a correlation measure, event tracking server 101 determines whether the joint occurrence of the detected event characteristic and the detected current event occurs at step 355 and determines the appropriate action based on the joint occurrence at step 356. (In some event scenarios, the detected event characteristic may be independent of the detected current event, where a correlation measure is small.) The joint occurrence may be expressed asjoint(C,E) as discussed above, where C denotes the detected event characteristic and E is the detected current event.

Figure 4:
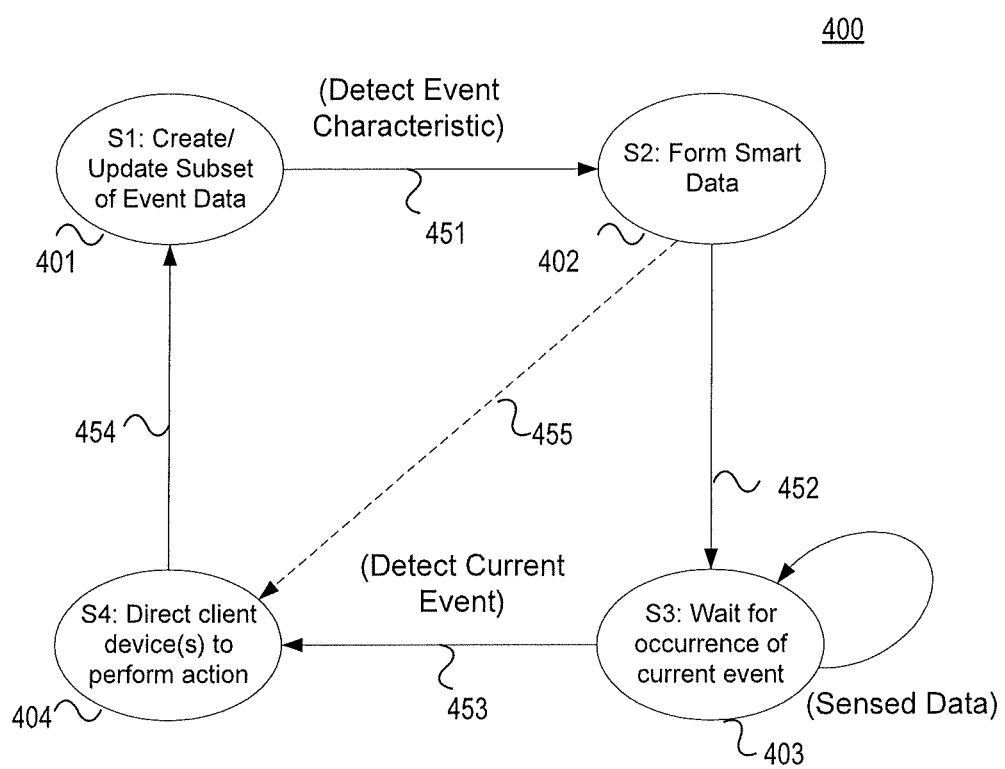
FIG. 4 depicts a state diagram that characterizes the operation of the event tracking server as shown in FIGS. 3A-3B in accordance with one or more embodiments.

FIG. 4 depicts state diagram 400 that characterizes the operation of the event tracking server 101 as shown in FIGS. 3A and 3B in accordance with one or more embodiments. During state 401, event tracking server 101 creates and/or updates the data subset for an entity. Once event tracking server 101 detects at least one event characteristic from the data subset at transition 451, event tracking server 101 forms smart data for the entity during state 402 and then transitions to state 403 at transition 452. Once a detected current event occurs, event tracking server 101 transitions to state 404 at transition 453, where event tracking server 101 directs a selected client device to perform a corresponding action. Event tracking server 101 then transitions back to state 401 at transition 454 in order to update the data subset for the entity based on updated data from storage devices 110 and 111. Event tracking server 101 subsequently operates in accordance with states 401-404 based on the updated data.

Figure 5A:
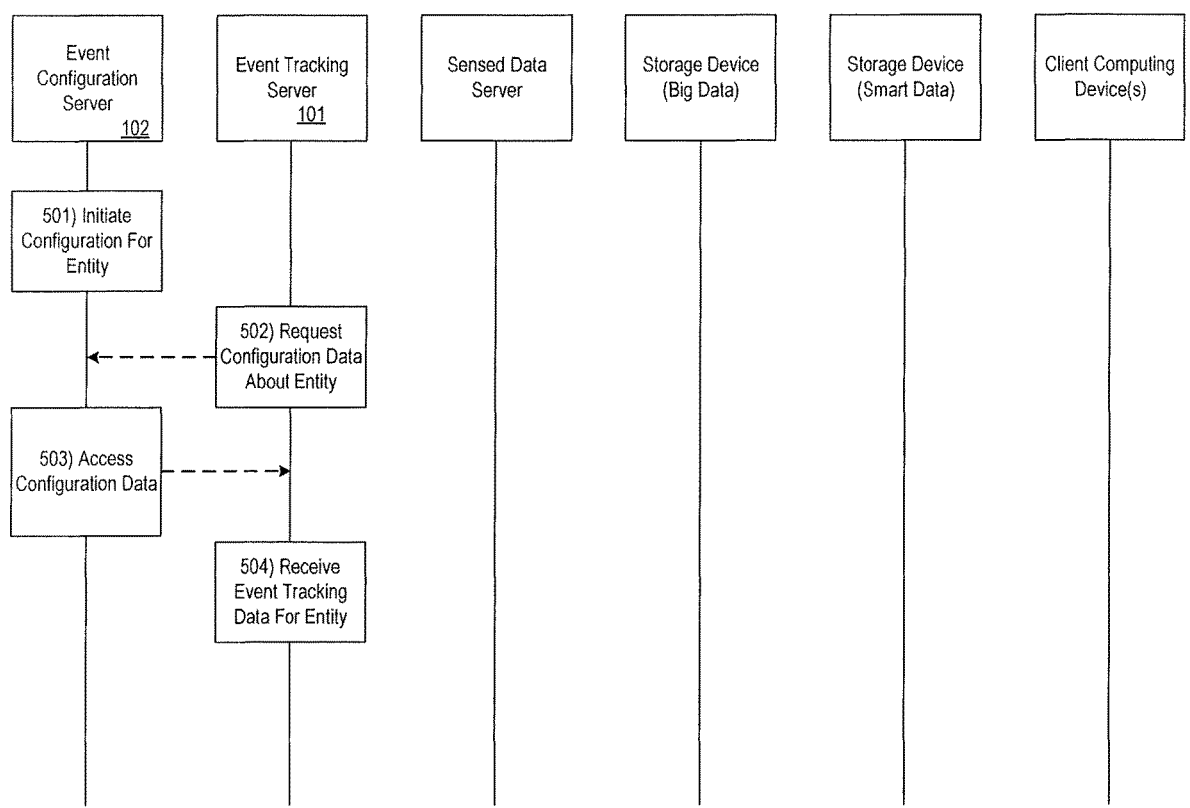
FIGS. 5A-5D depict an illustrative event sequence for multicomputer processing within the computing environment shown in FIG. 1 in accordance with one or more example embodiments.

With some embodiments, event tracking server 101 may transition from state 402 directly to state 404 at transition 455 without waiting for detecting a current event. For example, event tracking server 101 may detect a pattern where sales of product Z is almost periodic. Consequently, event tracking server 101 may generate a notification message directing a client computing device to invoke periodic ordering of product Z FIGS. 5A-5D depict an illustrative event sequence for multicomputer processing within the computing environment shown in FIG. 1 in accordance with one or more example embodiments. Referring to FIG. 5A, event configuration server 101 receives input information at step 501 for configuring event tracking for a specification entity as depicted by the graphical user interfaces shown in FIGS. 6-8 and supported by event configuration server 102.

Figure 6:
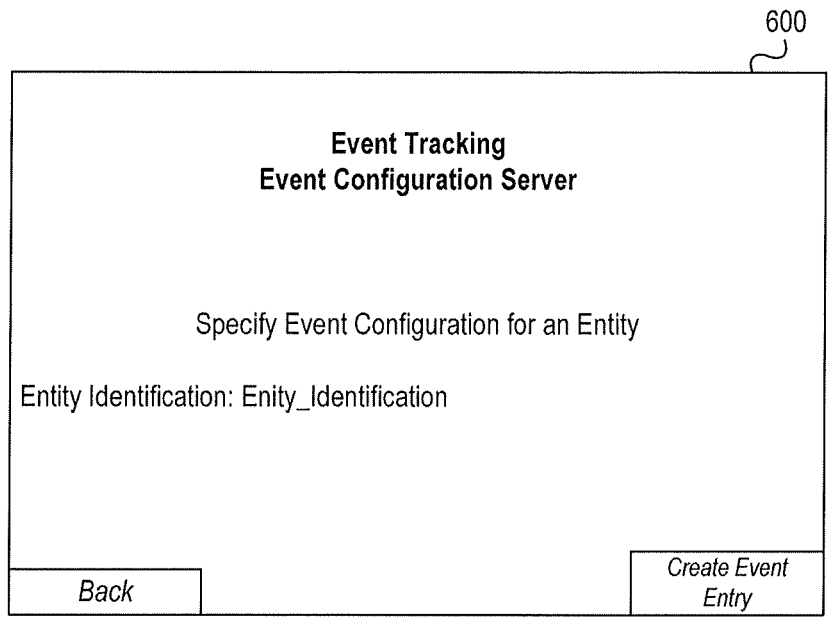
FIGS. 6-8 depict graphical user interfaces for entering configuration information through an event configuration server in accordance with one or more example embodiments.
Figure 7:
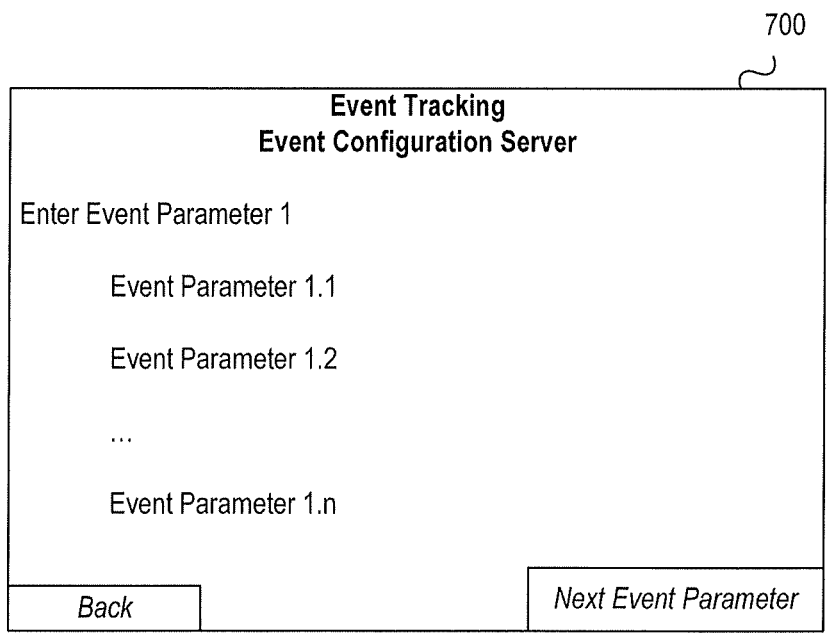

Referring to FIG. 6, configuration for event tracking is initiated for a specified entity through graphical user interface 600. The entity is identified by a unique identification such as a user name, social security number, or the like. Configuration continues through graphical user interface 700 as shown in FIG. 7. Event tracking is subsequently executed by event tracking server 101 based on the one or more event parameters. Event parameters may specify one or more event elements spanning a possible event scenarios.

For example, event parameters may specify a vendor and/or product during a given time duration involving the entity (customer). All of the event parameters are entered via one or more pages depicted in FIG. 7. As will be discussed, event tracking server 101 subsequently applies the entered event parameters to big data collected for the entity in order to form smart data, determines an action, and directs an appropriate event element (which may be the entity or some other element involved in the event scenario) to perform the determined action.

Figure 8:
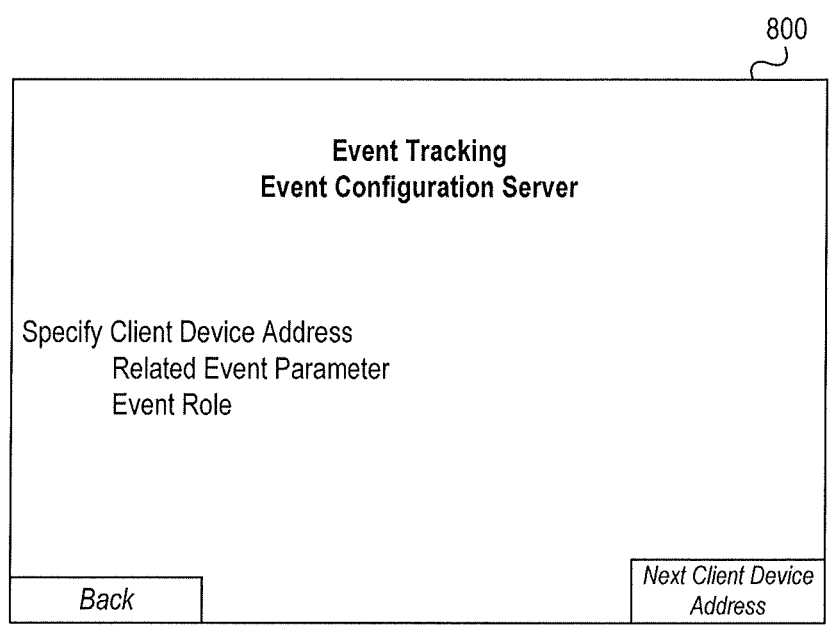

Referring to FIG. 8, one or more client device addresses (e.g., phone number or IP address) is entered through graphical user interface 800. A device address may specify a related event parameter and/or a corresponding role during an event scenario. For example, the corresponding role during an event scenario may be a buyer or seller, an employer or employee, and so forth. Based on the corresponding role during an event scenario, an appropriate action is initiated via the corresponding client device. For example, different actions may be determined for a buyer versus a seller.

With some embodiments, one or more client devices may be associated with an event element, where one or more client device addresses is entered via one or more pages depicted in FIG. 8.

Event configuration via graphical user interfaces 600, 700, and 800 may be repeated for additional entities.

Referring back to FIG. 5A, event tracking server 101 may subsequently request for configuration data at step 502 in order to execute event tracking for an entity. In response to the request, event configuration server 102 attempts to access the configuration data at step 503. However, with some embodiments, a privacy indicator may be supported so that an entity may opt out of event tracking. For example, privacy issues may be of a concern with some entities (e.g., a person or business) since the geographical location of the entity's client device may be tracked. If permitted under the above constraints, event tracking server 101 receives one or more event parameters, client device addresses, and so forth at step 504. However, if privacy is invoked for the entity, event configuration server 102 may deny access of the event tracking data at step 503.

With some embodiments, while not explicitly shown in FIGS. 6-8, action information may also be provided during the configuration of event tracking for an entity. Action information may comprise a set of possible actions that are invoked at client computing devices when different pairs of event characteristics and current events are detected as will be discussed later.

Figure 5B:
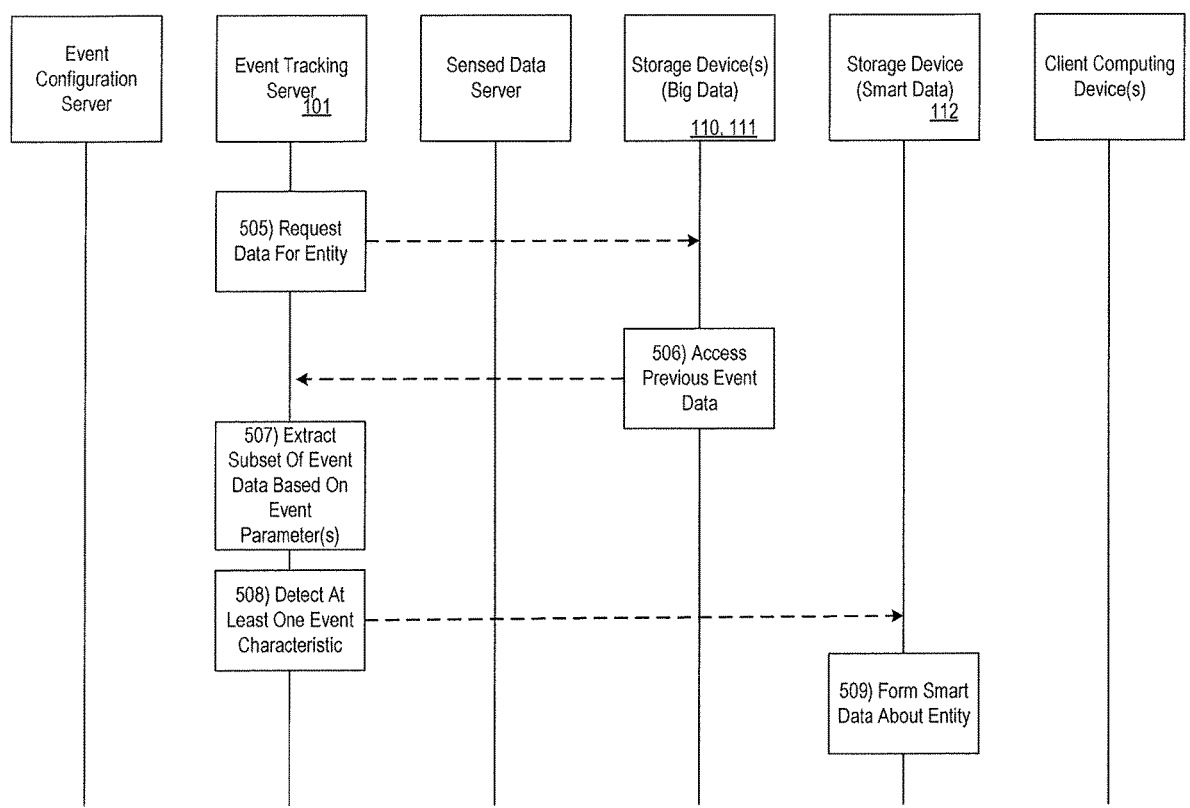

Referring to FIG. 5B, at step 505 event tracking server 101 requests for data about the identified entity from one or more data sources 110 and 111 and receives previous event data (e.g., about previous transactions) about the entity at step 506. The accessed big data may be large in volume and be cumbersome to process during subsequent execution of event tracking. To address this concern, event tracking server 101 extracts a data subset based on the one or more event parameters at step 507.

At step 508, event tracking server 101 attempts to detect one or more event characteristics (for example, patterns or trends) that characterize the data subset. Based on the one or more detected event characteristics, at step 509 event tracking server 101 transforms the subset to form smart data for the entity. For example, in reference to a previously discussed example, event tracking server 101 may detect that Joe (corresponding to the entity) shops at store A almost every Saturday morning to purchase product X (for example, 90 percent of the time). We may denote this detected event characteristics as $C_1$. Event tracking server 101 may detect additional event characteristics (denoted as $C_2, C_3, \ldots, C_n$) from the data subset. Based on the detect event characteristics, the data subset may be transformed to reflect the detected event characteristics, thus forming smart data for the entity. Consequently, event tracking server 101 may operate more efficiently, for example operating faster, by accessing the smart data rather than the big data during subsequent event tracking.

Figure 5C:
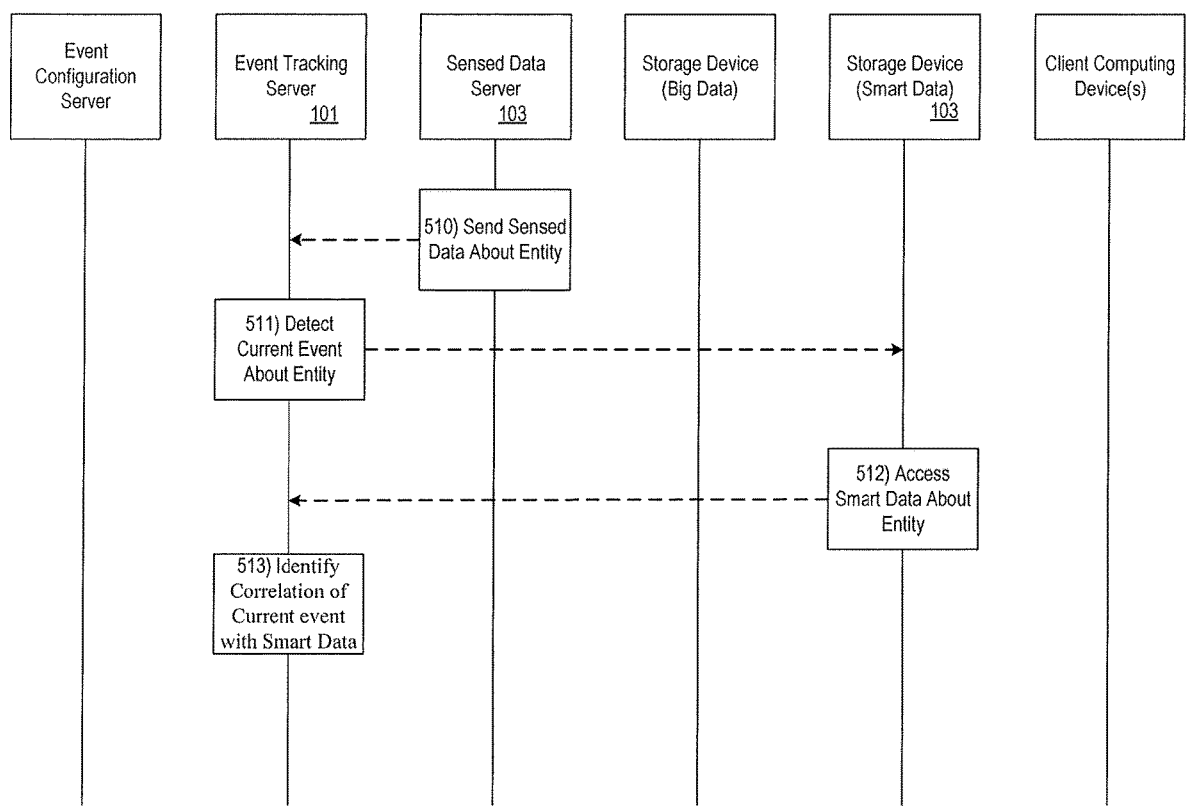

Referring to FIG. 5C, event tracking server 101 receives sensed data about the event elements (e.g., the entity) from sensed data server 103 at step 510. For example, sensed data may include time-stamped geographical location data as well as the identification of the device providing the information. From the received sensed data, event tracking server 101 may determine the occurrence of one or more current events ($E_1, E_2, \ldots, E_m$) about the entity at step 511.

At step 512, event tracking server accesses smart data for the entity, where the smart data is indicative of the detected event characteristics of previous event data. At step 513, event tracking server 101 identifies correlation measure (correlation($C_i, E_j$)) of each pair of detected event characteristics and detected events.

Figure 5D:
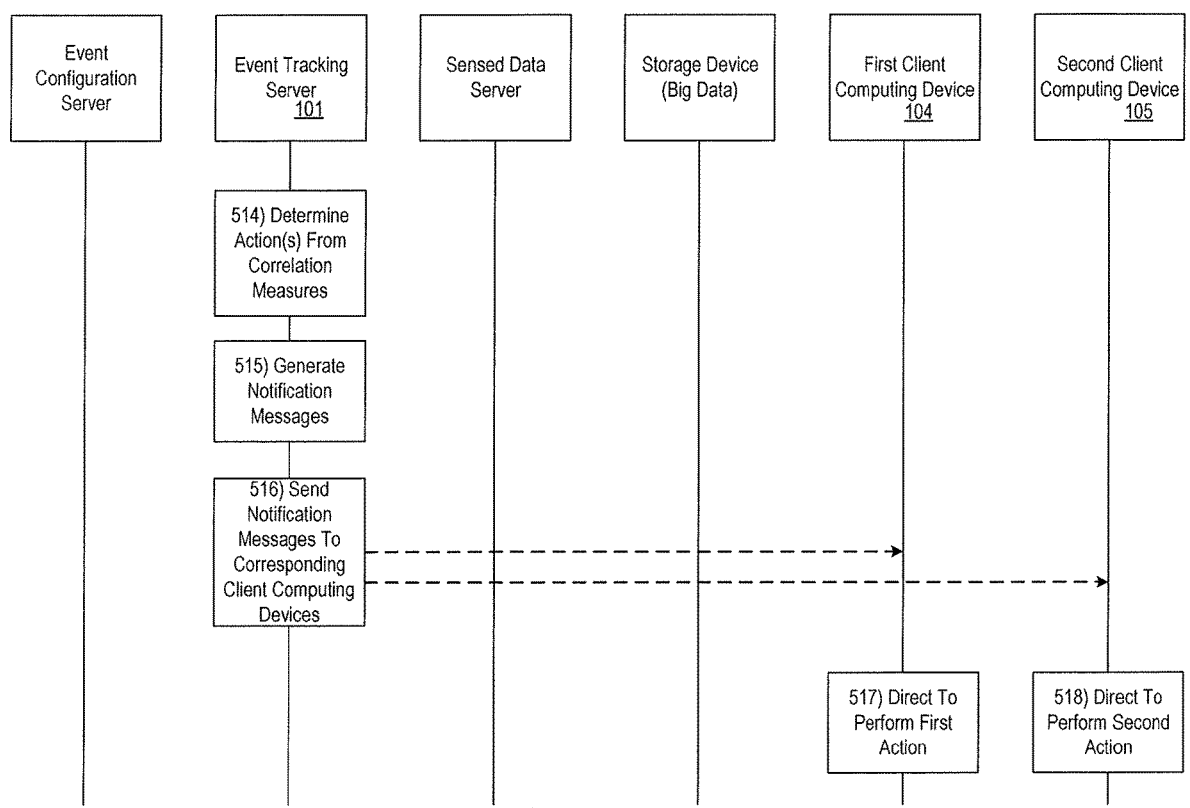

Referring to FIG. 5D, at step 514 event tracking server 101 determines one or more actions that should be initiated at one or more client computing device 104,105. As an example, at step 513, event tracking server 101 may have determined that correlation($C_1, E_1$)=0.1, correlation($C_1, E_2$)=0.9, and correlation($C_2, E_3$)=0.8. If a correlation threshold were set at 0.7, event tracking server 101 determines what actions are applicable for the pair($C_1, E_2$) and pair($C_2, E_3$) but not for pair($C_1, E_1$). As previously discussed, event tracking server 101 may obtain a set of possible actions ($A_1, A_2, \ldots, A_p$) from event configuration server 102. Event tracking server 102 may then match the set of actions that are appropriate for the event elements corresponding to the detected pair. For example, $A_3$ may apply to one event element while $A_7$ may apply to another event element in the detected pair.

At steps 515 and 516, event tracking server 101 generates and sends notification messages to the selected client computing devices 104,105 that are indicative of the determined actions, where the selected client computing devices may be associated with different event elements. When received, the selected computing devices 104,105 are directed to perform the determined actions at steps 517 and 518.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   receiving event data, wherein the event data is indicative of previous events for an entity;
   obtaining at least one event parameter about the entity;
   extracting a subset of the event data based on the at least one event parameter;
   detecting a first event characteristic from the subset based on the at least one event parameter;
   receiving sensed data about the entity;
   detecting a first current event from the sensed data;
   detecting whether a first joint occurrence of the first current event and the detected first event characteristic has occurred;
   determining a first action about the entity when the first joint occurrence is detected;
   detecting a third event characteristic from the subset based on the at least one event parameter;
   detecting a third current event and a fourth current event from the sensed data;
   obtaining a correlation measure of the third current event and the third event characteristic, wherein the correlation measure is greater than a predetermined threshold and wherein the correlation measure is indicative of how likely that the third current event and the third event characteristic occur together;
   detecting whether a fourth joint occurrence of the correlation measure and the fourth detected current event has occurred;
   determining a fifth action about the entity when the fourth joint occurrence is detected;
   selecting a first client computing device from a plurality of client computing devices;
   generating a first notification message indicative of the first action and the fifth action; and
   sending, to the first client computing device, the first notification message directing the first client computing device to perform the first action and the fifth action.

2. The method of claim 1, wherein the first event characteristic is indicative of a pattern of the previous events that occurred with the entity.

3. The method of claim 1 comprising:
   detecting a second event characteristic from the subset based on the at least one event parameter;
   detecting whether a second joint occurrence of the first current event and the detected second event characteristic has occurred; and
   determining a second action about the entity when the second joint occurrence is detected, wherein the first action is different from the second action.

4. The method of claim 3 comprising:
   determining a third action about the entity when the first joint occurrence and the second joint occurrence are detected, wherein the first, second, and third actions are different.

5. The method of claim 3 comprising:
   sending to a second client computing device, a second notification message directing the second client computing device to perform the second action.

6. The method of claim 1 comprising:
   detecting a second current event from the sensed data;
   detecting whether a third joint occurrence of the second current event and the detected first event characteristic has occurred; and
   determining a fourth action about the entity when the third joint occurrence is detected, wherein the fourth action is different from the first action.

7. The method of claim 1 comprising:
   transforming the subset of the event data based on the first event characteristic.

8. The method of claim 1, wherein the first current event is associated with an activity of the entity.

9. The method of claim 1, wherein the first current event externally occurs with respect to the entity.

10. The method of claim 1, wherein the first event characteristic is indicative of a determined trend of the subset of the event data.

11. The method of claim 1, wherein the detecting the first current event comprises;
    obtaining geographical and time data about the entity.

12. A computing platform comprising:
at least one processor;
a communication interface communicatively coupled to the at least one processor;
a sensed data interface coupled to the at least one processor;
an input sensed data interface coupled to the at least one processor; and
at least one memory device storing computer-readable instructions that, when executed by the at least one processor, cause the computing platform to perform:
receiving event data, wherein the event data is indicative of previous events for an entity;
obtaining, via an input interface, at least one event parameter about the entity;
extracting a subset of the event data based on the at least one event parameter;
detecting a first event characteristic from the subset based on the at least one event parameter, wherein the first event characteristic is indicative of a pattern of the previous events that occurred with the entity;
receiving, via an event interface, sensed data about the entity;
detecting a first current event from the sensed data;
detecting whether a first joint occurrence of the first current event and the detected first event characteristic has occurred;
determining a first action about the entity when the first joint occurrence is detected;
detecting a third event characteristic from the subset based on the at least one event parameter;
detecting a third current event and a fourth current event from the sensed data;
obtaining a correlation measure of the third current event and the third event characteristic, wherein the correlation measure is greater than a predetermined threshold and wherein the correlation measure is indicative of how likely that the third current event and the third event characteristic occur together;
detecting whether a fourth joint occurrence of the correlation measure and the fourth detected current event has occurred;
determining a fifth action about the entity when the fourth joint occurrence is detected;
selecting a client computing device from a plurality of computing devices;
generating a first notification message indicative of the first action and the fifth action; and
sending, via the communication interface to the client computing device, the first notification message directing the client computing device to perform the first action and the fifth action.

13. The computing platform of claim 12, wherein the at least one memory device stores additional computer-readable instructions that, when executed by the at least one processor, cause the computing platform to perform:
detecting a second event characteristic from the subset based on the at least one event parameter;
detecting whether a second joint occurrence of the first current event and the detected second event characteristic has occurred; and
determining a second action about the entity when the second joint occurrence is detected, wherein the first action is different from the second action.

14. The computing platform of claim 12, wherein the at least one memory device stores additional computer-readable instructions that, when executed by the at least one processor, cause the computing platform to perform:
detecting a second current event from the sensed data;
detecting whether a third joint occurrence of the second current event and the detected first event characteristic has occurred; and
determining a third action about the entity when the third joint occurrence is detected, wherein the third action is different from the first action.

15. One or more non-transitory computer-readable media storing instructions that, when executed by a computing platform comprising at least one processor, memory, and a communication interface, cause the computing platform to perform:
receiving event data, wherein the event data is indicative of previous events for an entity;
obtaining at least one event parameter about the entity;
extracting a subset of the event data based on the at least one event parameter;
detecting a first event characteristic from the subset based on the at least one event parameter;
receiving sensed data about the entity;
detecting a first current event from the sensed data;
detecting whether a first joint occurrence of the first current event and the detected first event characteristic has occurred;
determining a first action about the entity when the first joint occurrence is detected;
detecting a third event characteristic from the subset based on the at least one event parameter;
detecting a third current event and a fourth current event from the sensed data;
obtaining a correlation measure of the third current event and the third event characteristic, wherein the correlation measure is greater than a predetermined threshold and wherein the correlation measure is indicative of how likely that the third current event and the third event characteristic occur together;
detecting whether a fourth joint occurrence of the correlation measure and the fourth detected current event has occurred;
determining a fifth action about the entity when the fourth joint occurrence is detected;
selecting a client computing device from a plurality of computing devices;
generating a first notification message indicative of the first action; and
sending, to the client computing device, the first notification message directing the client computing device to perform the first action.

16. The one or more non-transitory computer-readable media of claim 15 storing instructions that, when executed by the computing platform, cause the computing platform to perform:
detecting a second event characteristic from the subset based on the at least one event parameter;
detecting whether a second joint occurrence of the first current event and the detected second event characteristic has occurred; and
determining a second action about the entity when the second joint occurrence is detected, wherein the first action is different from the second action.

17. The one or more non-transitory computer-readable media of claim 15 storing instructions that, when executed by the computing platform, cause the computing platform to perform:

detecting a second current event from the sensed data;
detecting whether a third joint occurrence of the second current event and the detected first event characteristic has occurred; and
determining a third action about the entity when the third joint occurrence is detected, wherein the third action is different from the first action.

\* \* \* \* \*